(12) United States Patent
Moskovits et al.

(10) Patent No.: US 11,283,845 B1
(45) Date of Patent: *Mar. 22, 2022

(54) SYSTEM, METHOD, AND COMPUTER PROGRAM FOR MANAGING CONFERENCE CALLS BETWEEN A PLURALITY OF CONFERENCE CALL SYSTEMS

(71) Applicant: Amdocs Development Limited, Limassol (CY)

(72) Inventors: Diego Moskovits, Kfar Sabah (IL); Golan Nuri, Ra'anana (IL); Ben Menashe, Boulder, CO (US); Aran Azarzar, Meitar (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 203 days.

This patent is subject to a terminal disclaimer.

(21) Appl. No.: 16/879,616

(22) Filed: May 20, 2020

Related U.S. Application Data

(63) Continuation of application No. 15/612,050, filed on Jun. 2, 2017, now Pat. No. 10,701,117.

(51) Int. Cl.
*H04L 65/403* (2022.01)
*H04N 7/14* (2006.01)
*H04L 65/1069* (2022.01)
*H04L 65/10* (2022.01)

(52) U.S. Cl.
CPC ...... *H04L 65/4046* (2013.01); *H04L 65/1006* (2013.01); *H04L 65/1069* (2013.01); *H04N 7/147* (2013.01)

(58) Field of Classification Search
CPC ............ H04L 65/4046; H04L 65/1006; H04L 65/1069; H04N 7/147
See application file for complete search history.

(56) References Cited

U.S. PATENT DOCUMENTS

| | | | |
|---|---|---|---|
| 9,860,368 B2 * | 1/2018 | Aggarwal | H04L 51/36 |
| 2014/0067401 A1 * | 3/2014 | Sanjeeva | G06F 16/3344 704/260 |
| 2017/0279760 A1 * | 9/2017 | Li | H04L 41/5093 |

* cited by examiner

*Primary Examiner* — Philip J Chea
*Assistant Examiner* — Robert B McAdams
(74) *Attorney, Agent, or Firm* — Zilka-Kotab, P.C.

(57) ABSTRACT

A system, method, and computer program product are provided for managing conference calls between a plurality of conference call systems. In operation, a conference management system monitors a plurality of call conference systems to determine whether at least one first conference system is attempting to connect to at least one second conference system. The conference management system connects the at least one first conference system with the at least one second conference system such that communication between the at least one first conference system and the at least one second conference system is managed by the conference management system. Additionally, the conference management system provides one suite of services to users of the at least one first conference system and the at least one second conference system.

20 Claims, 9 Drawing Sheets

SYSTEM, METHOD, AND COMPUTER PROGRAM FOR MANAGING CONFERENCE CALLS BETWEEN A PLURALITY OF CONFERENCE CALL SYSTEMS

RELATED APPLICATION(S)

This application is a continuation of U.S. application Ser. No. 15/612,050, filed Jun. 2, 2017 and entitled "SYSTEM, METHOD, AND COMPUTER PROGRAM FOR MANAGING CONFERENCE CALLS BETWEEN A PLURALITY OF CONFERENCE CALL SYSTEMS," which is hereby incorporated by reference in its entirety.

FIELD OF THE INVENTION

The present invention relates to conference call systems (audio and/or video), and more particularly to managing conference calls between a plurality of conference call systems.

BACKGROUND

Currently, when different conference call systems are engaged in communication, the conference call systems operate as independent audio\video systems, where each system uses its own native environment and feature suite as a stand-alone system. The Session Initiation Protocol (SIP) standard is different from one product to another, and as a result, the compatibility level is low. There is not one unified communication system. Each platform comes with native management and monitoring tools and offers different user experiences.

There is thus a need for addressing these and/or other issues associated with the prior art.

SUMMARY

A system, method, and computer program product are provided for managing conference calls between a plurality of conference call systems. In operation, a conference management system monitors a plurality of call conference systems to determine whether at least one first conference system is attempting to connect to at least one second conference system. The conference management system connects the at least one first conference system with the at least one second conference system such that communication between the at least one first conference system and the at least one second conference system is managed by the conference management system. Additionally, the conference management system provides one suite of services to users of the at least one first conference system and the at least one second conference system.

DETAILED DESCRIPTION

Figure 1:
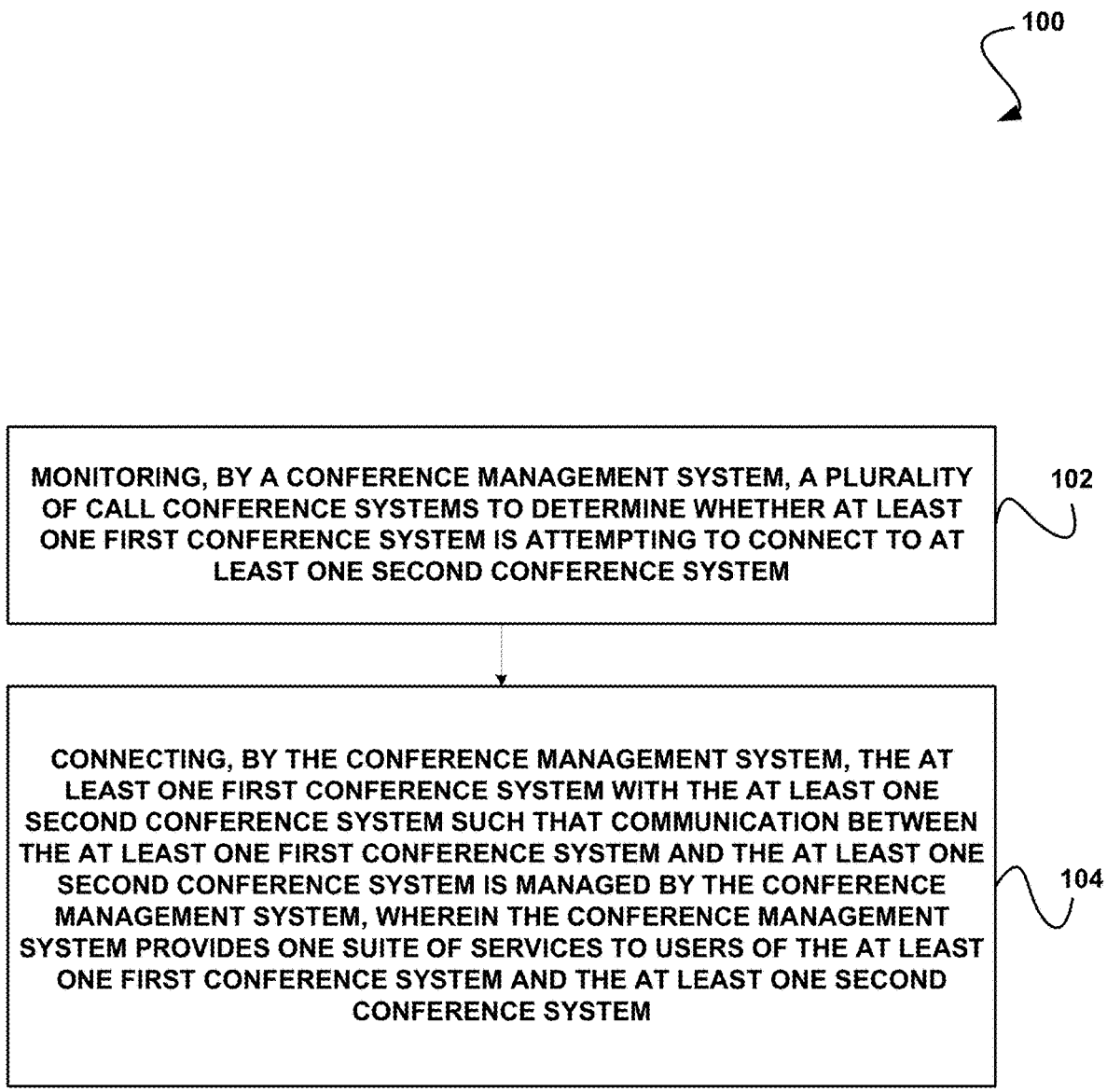
FIG. 1 illustrates a method for managing conference calls between a plurality of conference call systems, in accordance with one embodiment.

FIG. 1 illustrates a method 100 for managing conference calls between a plurality of conference call systems, in accordance with one embodiment.

In operation, a conference management system monitors a plurality of call conference systems to determine whether at least one first conference system is attempting to connect to at least one second conference system. See operation 102. The first and/or second call conference systems may include video conference systems and/or audio conference systems. In various embodiments, the first and/or second call conference systems may include phones, computers, and/or monitors, etc. Additionally, the first and/or second call conference systems may implement user interfaces for interfacing with the conference management system (e.g. for initiating a call, etc.).

When the conference management system determines that the at least one first conference system is attempting to connect to the at least one second conference system, the conference management system connects the at least one first conference system with the at least one second conference system such that communication between the at least one first conference system and the at least one second conference system is managed by the conference management system. See operation 104. The conference management system provides one suite of services to users of the first conference system(s) and the second conference system(s).

The one suite of services includes resources of the first conference system(s) and/or the second conference system(s). These resources may include, for example, interface (e.g. GUI, etc.) functionality such as video and/or audio settings, document sharing settings, participant addition/removal settings, note sharing functionally, and/or any other functionality or resources associated with the first conference system(s) and/or the second conference system(s).

In one embodiment, the conference management system may connect the first conference system(s) with the second conference system(s) utilizing application programming interfaces (APIs) associated with the first conference system(s) and the second conference system(s). The first conference system(s) and the second conference system(s) may include different Unified Communications (UC) platforms.

It should be noted that the method 100 may be implemented utilizing various systems, hardware, software, applications, user interfaces, etc., as dictated by the implementer. For example, the conference management system may include one or more processors, databases, etc., as well as implement various logic, computer code, applications, and/or user interfaces, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
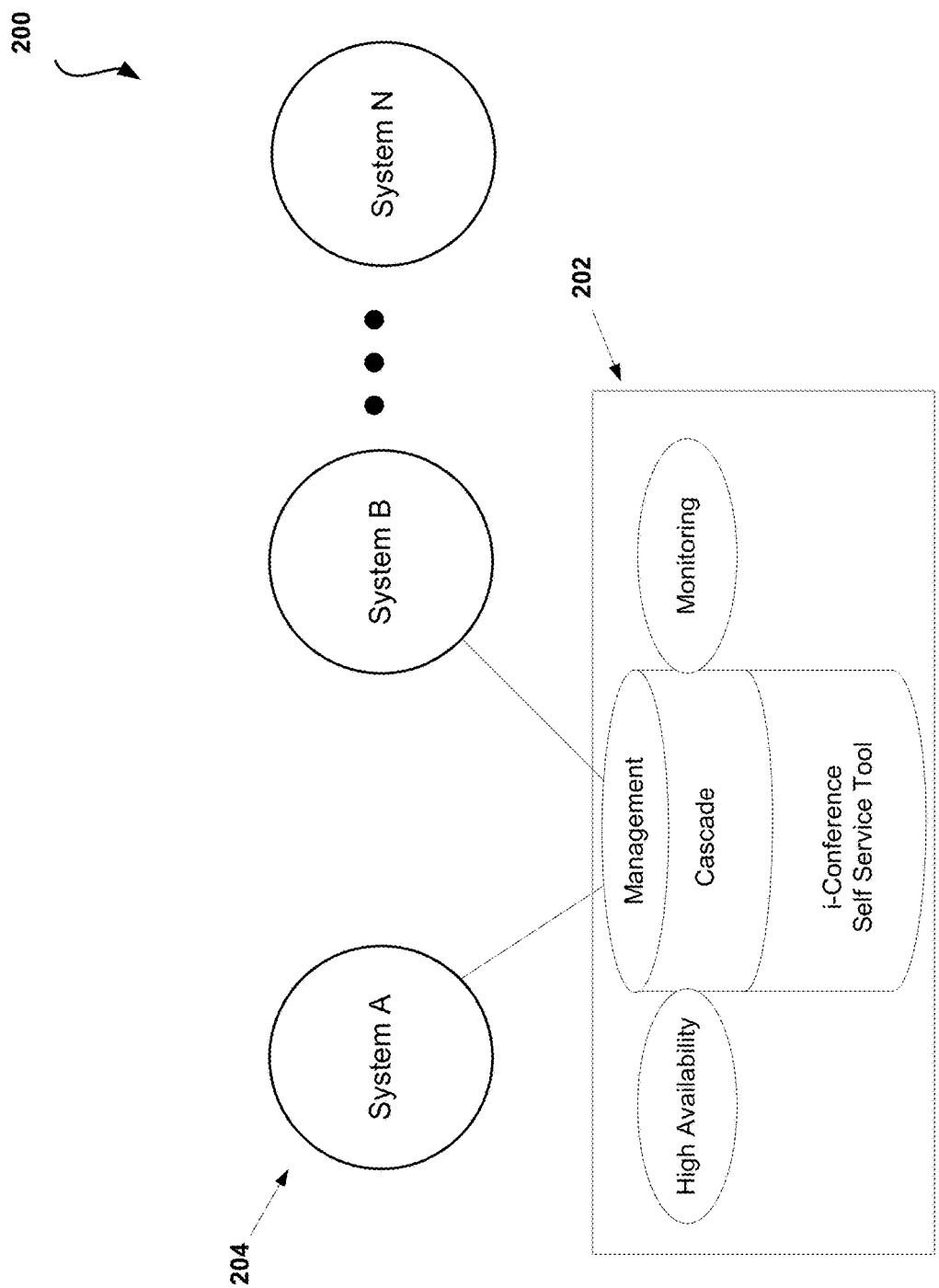
FIG. 2 shows a high level system diagram for managing conference calls between a plurality of conference call systems, in accordance with one embodiment.

FIG. 2 shows a high level system diagram 200 for managing conference calls between a plurality of conference call systems, in accordance with one embodiment. As an option, the system diagram 200 may be implemented in the context of the details of the previous figure and/or any subsequent figure(s). Of course, however, the system diagram 200 may be implemented in the context of any desired environment. Further, the aforementioned definitions may equally apply to the description below.

As shown, the system 200 includes a conference management system 202 for managing conference calls between a plurality of conference call systems 204. The conference management system 202 functions as a middleware between two or more different Unified Communications (UC) platforms. The conference management system 202 provides one simple user experience and one suite of services to users of the conference call systems 204.

The conference management system 202 uses the different platforms of the conference call systems 204 as resources (e.g. as a "backend" resources, etc.) and creates a shell of services on top of such resources. These services may include single management, high availability, monitoring, and self-service tools, etc.

In one embodiment, the conference management system 202 may include five major components: 1) one or more cascade core components; 2) a high availability component; 3) a management component; 4) a monitoring component; and 5) an i-Conference component.

In this case, the purpose of the cascade core component may be to establish the connection between the different conference call systems 204, which may be performed based on a set of rules and dialing requirements. In one embodiment, the cascade core component may include a security component that secures the connection between the different conference call systems 204 and verifies call establishment. One example of a cascade process performed by the cascade core component of the conference management system 202 is described in FIG. 3.

In one embodiment, the purpose of the high availability component is to make sure that the cascade core component works both locally and geographically, and that the cascade links established by the cascade core component back up each other automatically.

The purpose of the management component is to have one management and configuration tool for the different platforms of the conference call systems 204 and to manage all other components of the conference management system 202. In one embodiment, the management component may provide rules and terms for when and how to operate the cascade links of the cascade core components. In one embodiment, the cascade may be modified to check ongoing conferences in each platform and cascade only the shared conferences. In another embodiment, a cascade link may be created for every new conference.

The purpose of the monitoring component is to provide full event descriptions and indications to have a clear status view of all the components of the conference management system 202 and to provide drill-down information in case of failure.

The purpose of the i-Conference component is to give one user experience above all the platforms and to create set of common shared features between the platforms and to give the user the option to control the user's bridge, or delegate the user's credentials to another user. The i-Conference component may also function to record the call, dial out to third party systems, run a "lecture" mode, and/or export detail reports on the call parties etc.

In operation, a cascade component of the conference management system 202 monitors a first conference call system, "System A", for live conferences and determines that System A is trying to establish a new conference with a second conference call system, "System B".

Once the conference management system 202 finds a new conference, the conference management system 202 will look for a cascade channel to verify that it does not exist, and if it does not exist, the conference management system 202 will create the call between "System A" and "System B", excluding irrelevant conferences (SIP URI example: Dial-in number@Domain; VMR=XXXX;password=YYYY). Of course, this is a simplified example, as System A may try to create conferences with any number of other conference call systems.

The conference management system 202 increases the level of flexibility from standard call conference systems by adding the option to create different service levels, to solve the problem of adjusting service to a specific need. The conference management system 202 also reduces the risks of interoperability levels by adding multi-platform backup to increase the level of compatibility between different platforms. The conference management system 202 maintains user experiences by creating a seamless operation process for end users and allowing the users to use only a single platform. This mitigates the problems associated with having two standalone platforms.

The conference management system 202 connects the different platforms and provides management, without taking active part in the calls. In case of failure of one or more platforms, the conference management system 202 ensures that each system continues to work independently. Further, the conference management system 202 may use public APIs associated with the conference call systems 204 platforms. The conference management system 202 also ensures each participant uses the most native platform, so the level of integration between the platforms is always minimal.

Figure 3:
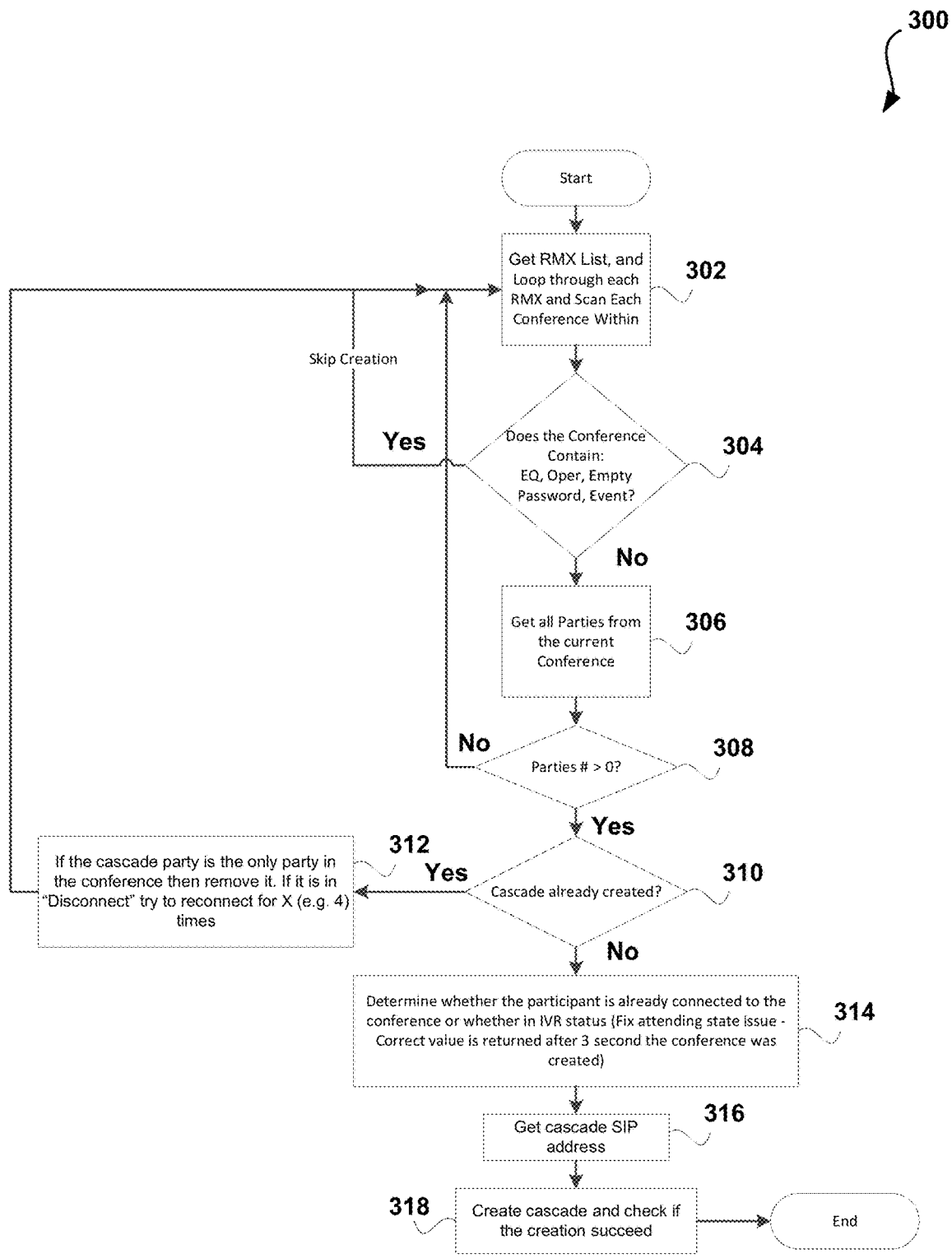
FIG. 3 shows a cascade process that may be performed by a conference management system, in accordance with one embodiment.

FIG. 3 shows a cascade process 300 that may be performed by a conference management system, in accordance with one embodiment. As an option, the process 300 may be implemented in the context of the details of the previous figures and/or any subsequent figure(s). Of course, however, the process 300 may be implemented in the context of any desired environment. Further, the aforementioned definitions may equally apply to the description below.

As shown, a conference management system obtains an RMX list, loops through each RMX, and scans each conference within the list. See operation 302. The conference management system then determines whether the conference contains information including EQ information, operator information, an empty password, and event information. See decision 304. The conference management system then obtains all parties from the current conference. See operation 306. If the number of parties is greater than zero, it is determined wither a cascade link has already been created. See decisions 308 and 310.

If the cascade party is the only party in the conference, then the conference management system removes it. If the conference is in "Disconnect", the conference management system tries to reconnect for a defined number of times (e.g. 2, 4, etc.). See operation 312.

If a cascade has not been created, the conference management system determines whether the participant is already connected to the conference or whether the conference is in Interactive Voice Response (IVR) status. See operation 314. The conference management system then gets a cascade SIP address, creates a cascade, and verifies that the creation succeeded. See operations 316 and 318.

Figure 4:
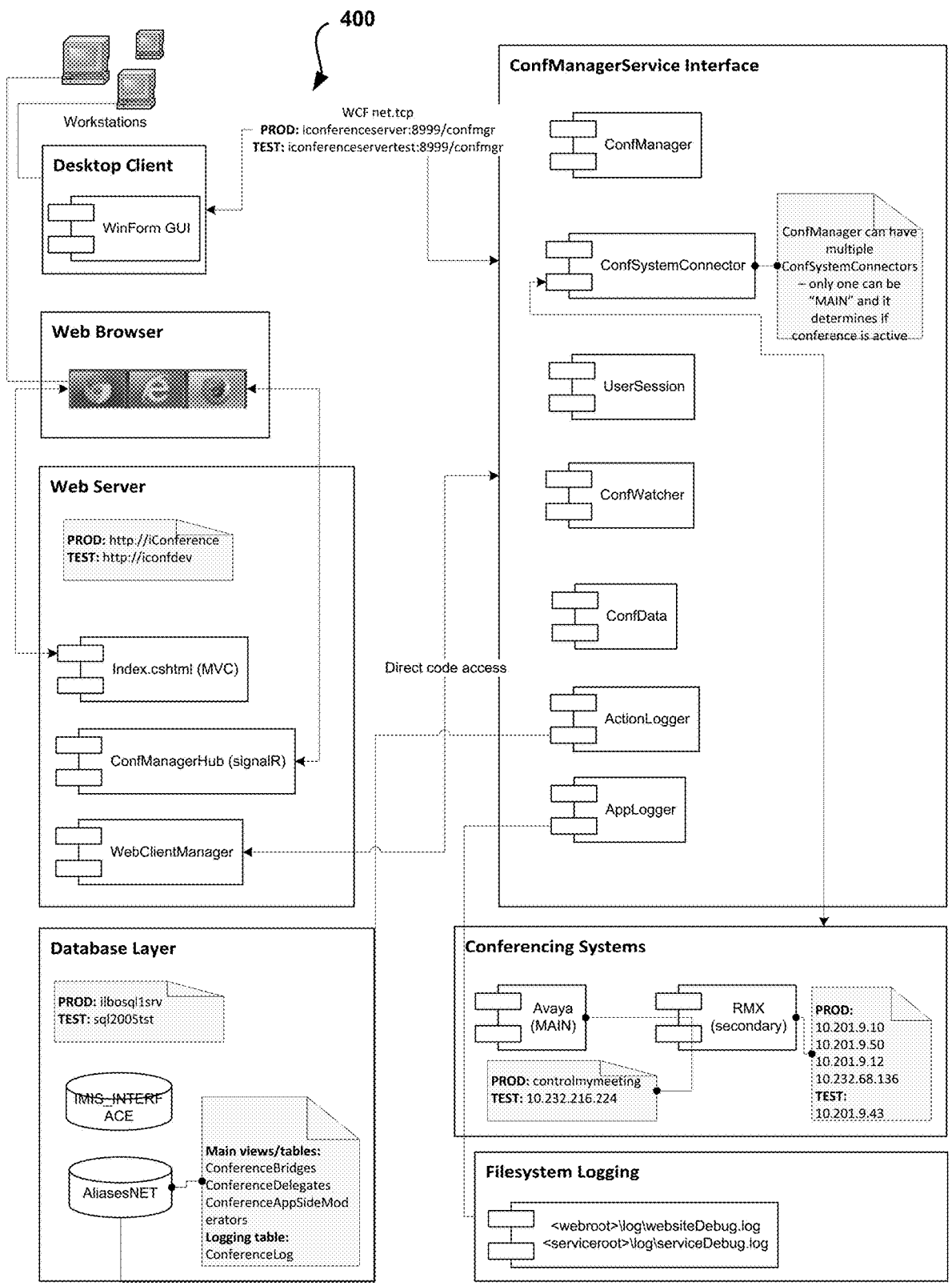
FIG. 4 shows a system diagram illustrating conference management system components, in accordance with one embodiment.

FIG. 4 shows a system diagram 400 illustrating conference management system components, in accordance with one embodiment. As an option, the diagram 400 may be implemented in the context of the details of the previous figures and/or any subsequent figure(s). Of course, however, the diagram 400 may be implemented in the context of any desired environment. Further, the aforementioned definitions may equally apply to the description below.

As shown, the conference management system may implement, interface with, and/or include one or more desktop clients, web browsers, web servers, database layers, service interfaces, conferencing systems, and/or file system logs.

Figure 5:
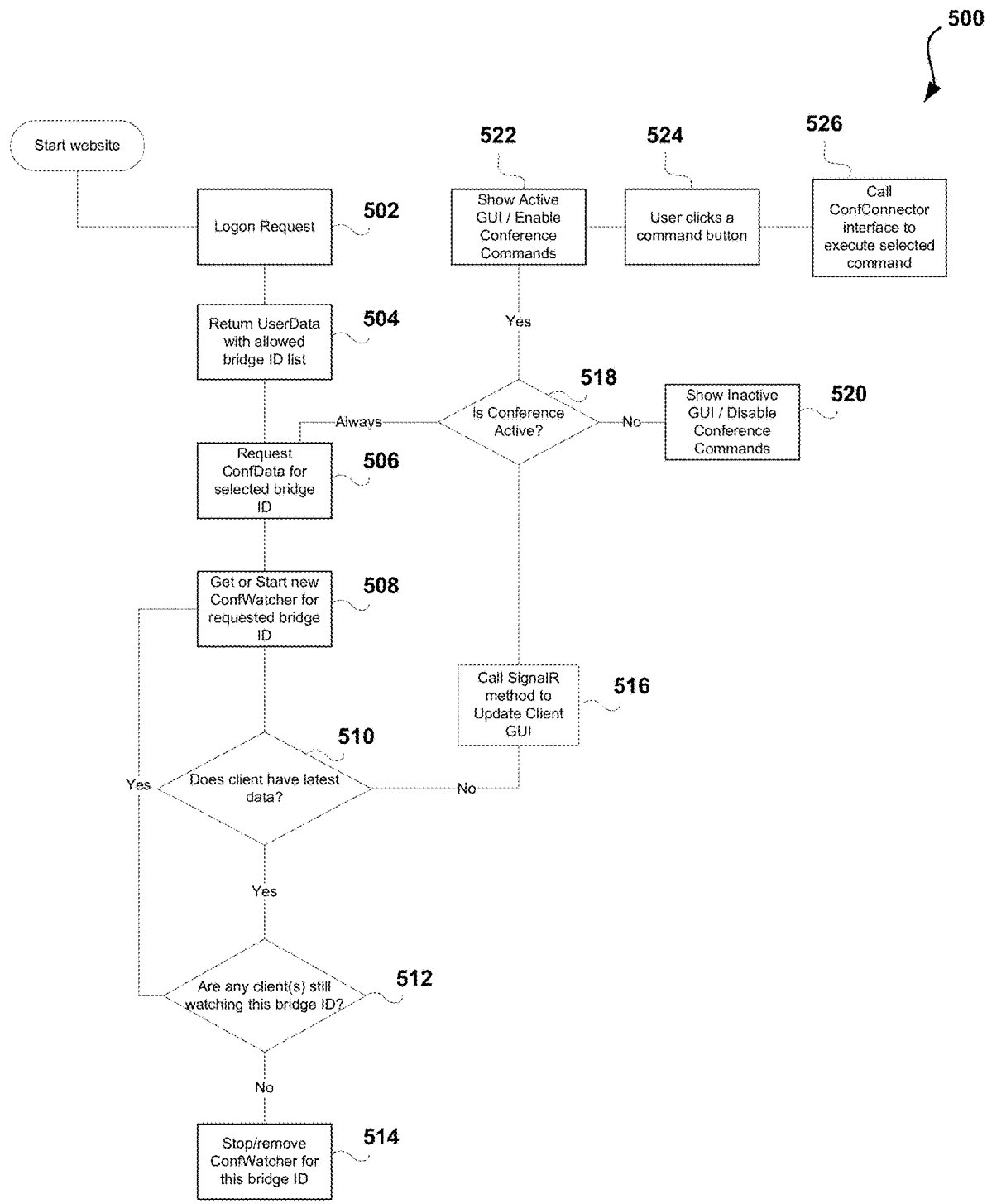
FIG. 5 shows a process for managing conference calls between a plurality of conference call systems, in accordance with one embodiment.

FIG. 5 shows a process 500 for managing conference calls between a plurality of conference call systems, in accordance with one embodiment. As an option, the process 500 may be implemented in the context of the details of the previous figures and/or any subsequent figure(s). Of course, however, the process 500 may be implemented in the context of any desired environment. Further, the aforementioned definitions may equally apply to the description below.

As shown, a user opens a website associated with a conference management system and sends a logon request utilizing a client device (e.g. a computer, phone, etc.). See operation 502. The conference management system returns User Data with an allowed bridge ID list. See operation 504.

The client requestor then requests configuration data for a selected bridge ID. See operation 506. The conference management system receives the request and obtains the data or starts a new ConfWatcher process for the requested bridge ID. See operation 508.

The conference management system then determines whether the client has the latest data. See decision 510. The conference management system also determines whether any clients are using the bridge ID. See decision 512. If not, the conference management system stops and removes the ConfWatcher process for the bridge ID. See operation 514.

If it is determined that the client does not have the latest data, the conference management system calls a SignalR process to update the client GUI. See operation 516. On the client side, the client determines whether the conference is active. See decision 518. If the conference is not active, an inactive GUI indicator is displayed and conference commands are disabled. See operation 520. If the conference is active, an active GUI indicator is displayed and conference commands are enabled. See operation 522. When a user clicks a command button utilizing the GUI, the conference call management system calls a ConfConnector interface to execute the selected command. See operations 524 and 526.

Figure 6:
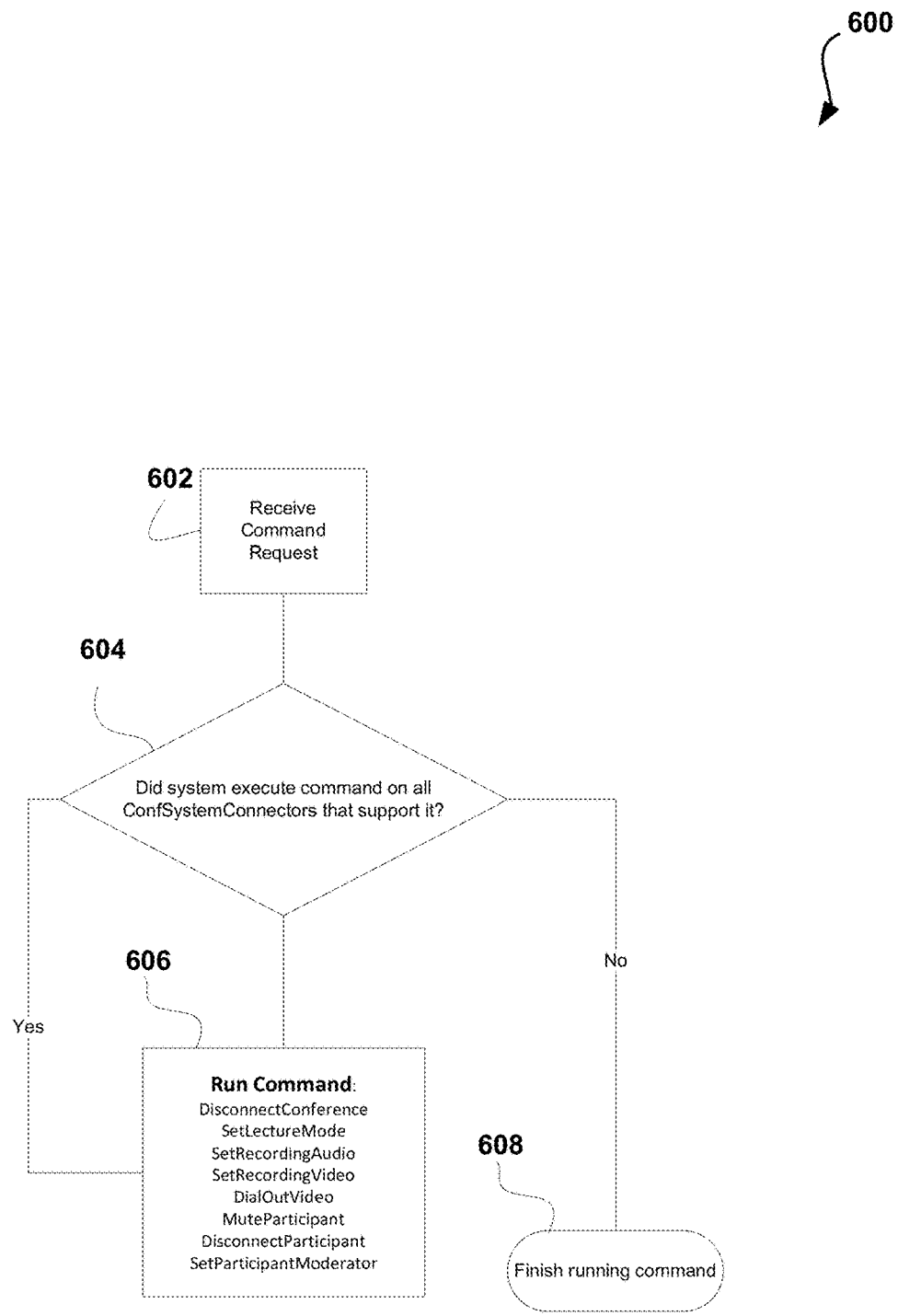
FIG. 6 shows a process for executing a command associated with a conference management system, in accordance with one embodiment.

FIG. 6 shows a process 600 for executing a command associated with a conference management system (e.g. operation 526 of FIG. 5), in accordance with one embodiment. As an option, the process 600 may be implemented in the context of the details of the previous figures and/or any subsequent figure(s). Of course, however, the process 600 may be implemented in the context of any desired environment. Further, the aforementioned definitions may equally apply to the description below.

As shown, a conference management system receives a command request. See operation 602. The conference management system determines whether it executed the command on all Conference System Connectors that support it. See decision 604. If it did, the conference management system runs various commands. See operation 606. If it did not, the conference management system finishes running the received command. See operation 608.

Figure 7:
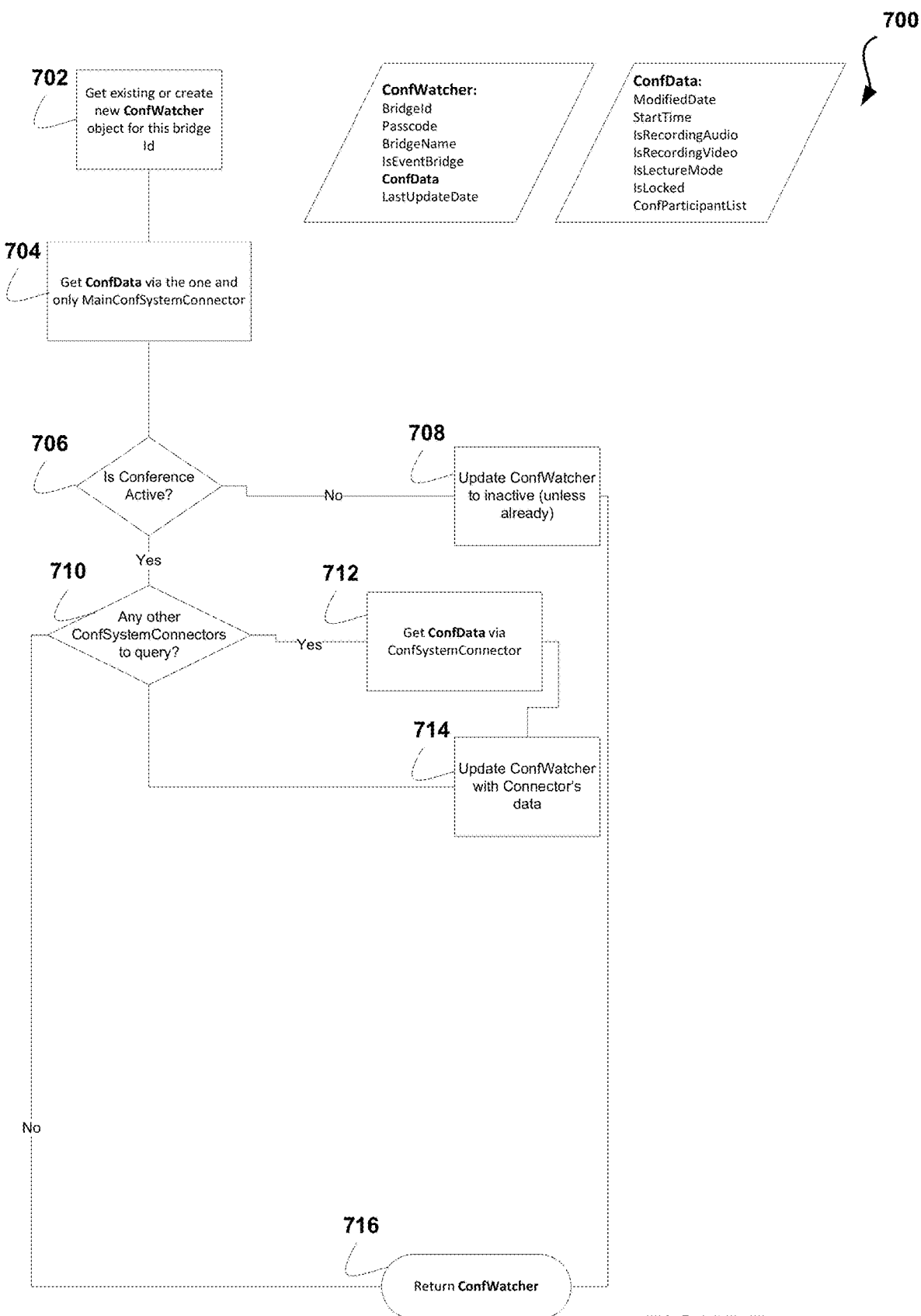
FIG. 7 shows a process for obtaining a bridge ID, in accordance with one embodiment.

FIG. 7 shows a process 700 for obtaining a bridge ID (e.g. operation 508 of FIG. 5), in accordance with one embodiment. As an option, the process 700 may be implemented in the context of the details of the previous figures and/or any subsequent figure(s). Of course, however, the process 700 may be implemented in the context of any desired environment. Further, the aforementioned definitions may equally apply to the description below.

As shown, a conference management system retrieves an existing Conference Watcher object or creates a new Conference Watcher object for a particular bridge Id. See operation 702. In one embodiment, the conference management system then retrieves configuration data via a Main Conference System Connector. See operation 704. In one embodiment, the conference management system may instead determine whether any Conference System Connector has active conference.

The conference management system then determines whether the conference is active. See operation 706. If the conference is not active, the conference management system updates the Conference Watcher process to inactive (unless it already is). See operation 708. If the conference is active, the conference management system determines whether there are any other Conference System Connectors to query. See decision 710. If there are, the conference management system retrieves configuration data via the Conference System Connector. See operation 712. The conference management system then updates the Conference Watcher process with the connector's data. See operation 714. Further, the conference management system returns Conference Watcher process. See operation 716.

Figure 8:
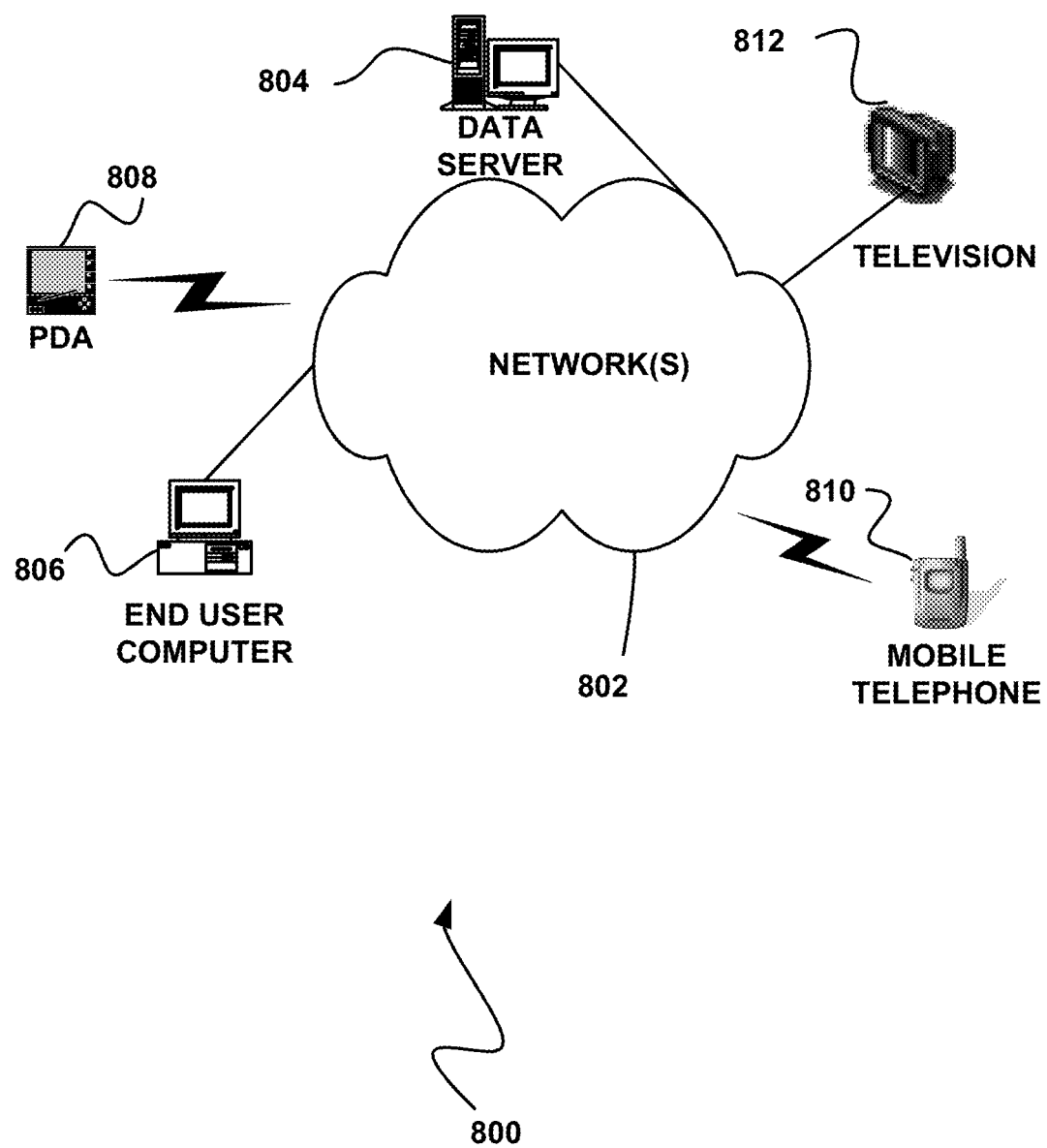
FIG. 8 illustrates a network architecture, in accordance with one possible embodiment.

FIG. 8 illustrates a network architecture 800, in accordance with one possible embodiment. As shown, at least one network 802 is provided. In the context of the present network architecture 800, the network 802 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 802 may be provided.

Coupled to the network 802 is a plurality of devices. For example, a server computer 804 and an end user computer 806 may be coupled to the network 802 for communication purposes. Such end user computer 806 may include a desktop computer, lap-top computer, and/or any other type of logic. Still yet, various other devices may be coupled to the network 802 including a personal digital assistant (PDA) device 808, a mobile phone device 810, a television 812, etc.

Figure 9:
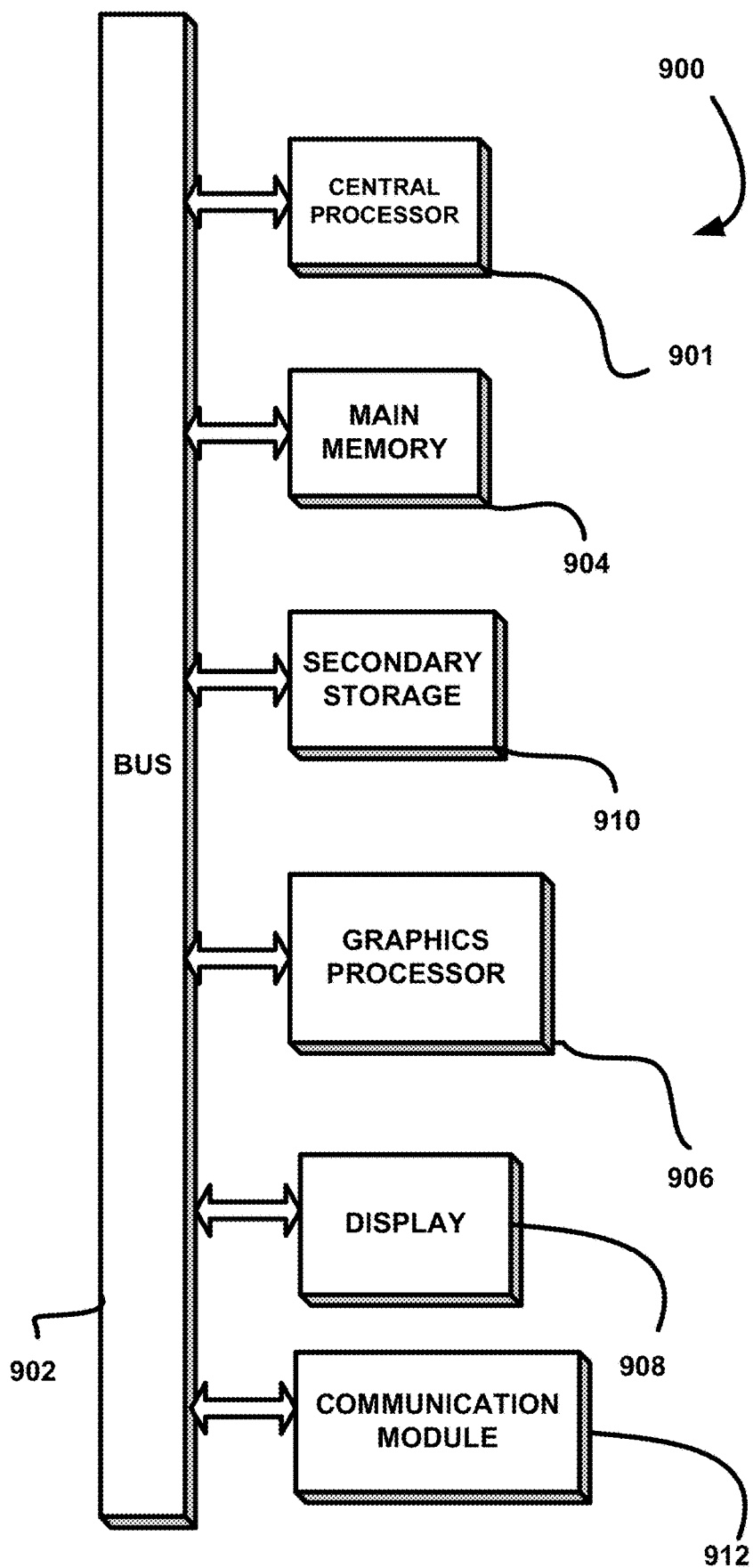
FIG. 9 illustrates an exemplary system, in accordance with one embodiment.

FIG. 9 illustrates an exemplary system 900, in accordance with one embodiment. As an option, the system 900 may be implemented in the context of any of the devices of the network architecture 800 of FIG. 8. Of course, the system 900 may be implemented in any desired environment.

As shown, a system 900 is provided including at least one central processor 901 which is connected to a communication bus 902. The system 900 also includes main memory 904 [e.g. random access memory (RAM), etc.]. The system 900 also includes a graphics processor 906 and a display 908.

The system 900 may also include a secondary storage 910. The secondary storage 910 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 904, the secondary storage 910, and/or any other memory, for that matter. Such computer programs, when executed, enable the system 900 to perform various functions (as set forth above, for example). Memory 904, storage 910 and/or any other storage are possible examples of non-transitory computer-readable media.

The system 900 may also include one or more communication modules 912. The communication module 912 may be operable to facilitate communication between the system 900 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   providing, by a conference management system, an interface between a plurality of call conference systems each including a different Unified Communications (UC) platform;
   providing, by the conference management system, a shared suite of services for the plurality of call conference systems, the shared suite of services created on top of the different Unified Communications (UC) platforms;
   monitoring, by the conference management system, the plurality of call conference systems to determine that a first call conference system of the plurality of call conference systems is attempting to connect to a second call conference system of the plurality of call conference systems;
   connecting, by the conference management system, the first call conference system with the second call conference system such that communication between the first call conference system and the second call conference system is managed by the conference management system using the shared suite of services.

2. The method of claim 1, wherein the plurality of call conference systems include video conference systems.

3. The method of claim 1, wherein the plurality of call conference systems include audio conference systems.

4. The method of claim 1, wherein connecting the first call conference system with the second call conference system includes utilizing application programming interfaces associated the first call conference system with the second call conference system.

5. The method of claim 1, wherein the shared suite of services include management.

6. The method of claim 1, wherein the shared suite of services include high availability.

7. The method of claim 1, wherein the shared suite of services include monitoring.

8. The method of claim 1, wherein the shared suite of services include self-service tools.

9. The method of claim 1, wherein the shared suite of services are created by the conference management system.

10. The method of claim 1, wherein the conference management system is a middleware between the different Unified Communications (UC) platforms.

11. The method of claim 1, wherein the conference management system makes the shared suite of services accessible to users of the plurality of call conference systems such that the users use only a single platform of the conference management system to establish a call conference via the connection between the first call conference system and the second call conference system thereby mitigating problems associated with having two standalone platforms including the first call conference system and the second call conference system.

12. The method of claim 11, wherein the shared suite of services includes resources of the plurality of call conference systems, the resources including interface functionality including video and audio settings, document sharing settings, participant addition and removal settings, and note sharing functionally.

13. The method of claim 1, wherein the conference management system includes:
   a cascade core component to connect the first call conference system with the second call conference system based on rules and dialing requirements, wherein the cascade core component includes a security component that secures the connection between the first call conference system with the second call conference system and verifies call establishment, and
   an i-Conference component that provides a unified user experience above all of the plurality of call conference systems by creating the shared suite of services for the plurality of call conference systems, wherein the i-Conference component provides users an option to control the user's bridge and delegate the user's credentials to another user.

14. The method of claim 13, wherein the i-Conference component functions to record a call, dial out to third party systems, run a "lecture" mode, and export detail reports on parties to the call.

15. A computer program product embodied on a non-transitory computer readable medium, comprising computer code for:
   providing, by a conference management system, an interface between a plurality of call conference systems each including a different Unified Communications (UC) platform;
   providing, by the conference management system, a shared suite of services for the plurality of call conference systems, the shared suite of services created on top of the different Unified Communications (UC) platforms;
   monitoring, by the conference management system, the plurality of call conference systems to determine that a first call conference system of the plurality of call conference systems is attempting to connect to a second call conference system of the plurality of call conference systems;
   connecting, by the conference management system, the first call conference system with the second call conference system such that communication between the first call conference system and the second call conference system is managed by the conference management system using the shared suite of services.

16. The computer program product of claim 15, wherein the shared suite of services include management.

17. The computer program product of claim 15, wherein the shared suite of services include high availability.

18. The computer program product of claim 15, wherein the shared suite of services include monitoring.

19. The computer program product of claim 15, wherein the shared suite of services include self-service tools.

20. A conference management system comprising one or more processors operable for:
- providing, by the conference management system, an interface between a plurality of call conference systems each including a different Unified Communications (UC) platform;
- creating, by the conference management system, a shared suite of services for the plurality of call conference systems, the shared suite of services being created on top of the different Unified Communications (UC) platforms;
- monitoring, by the conference management system, the plurality of call conference systems to determine that a first call conference system of the plurality of call conference systems is attempting to connect to a second call conference system of the plurality of call conference systems;
- connecting, by the conference management system, the first call conference system with the second call conference system such that communication between the first call conference system and the second call conference system is managed by the conference management system using the shared suite of services.

* * * * *